United States Patent [19]

Wayte

[11] Patent Number: 5,356,545
[45] Date of Patent: Oct. 18, 1994

[54] CURABLE DRY FILM LUBRICANT FOR TITANIUM ALLOYS

[75] Inventor: Peter Wayte, Cincinnati, Ohio

[73] Assignee: General Electric Company, Cincinnati, Ohio

[21] Appl. No.: 641,229

[22] Filed: Jan. 15, 1991

[51] Int. Cl.$^5$ .................. C10M 147/00; F03B 3/12
[52] U.S. Cl. .................... 252/28; 252/25; 252/58; 416/219 R
[58] Field of Search ............ 252/25, 58, 28; 416/219 R

[56] References Cited

U.S. PATENT DOCUMENTS

| | | | |
|---|---|---|---|
| 3,223,626 | 12/1965 | Murphy, Jr. et al. | 252/25 |
| 3,314,885 | 4/1967 | Murphy, Jr. | 252/25 |
| 3,793,195 | 2/1974 | Betts | 252/12 |
| 3,910,719 | 10/1975 | Hessler et al. | 416/134 |
| 3,968,289 | 7/1976 | Higbee | 524/310 |
| 4,172,622 | 10/1979 | Baker et al. | 428/626 |
| 4,215,181 | 7/1980 | Betts | 403/365 |
| 4,338,376 | 7/1982 | Kritzler | 252/28 |
| 4,868,275 | 9/1989 | Kato et al. | 528/125 |
| 4,892,669 | 1/1990 | Marcora et al. | 252/28 |

FOREIGN PATENT DOCUMENTS

| | | |
|---|---|---|
| 0341455 | 11/1989 | European Pat. Off. . |
| 2317342 | 2/1977 | France . |
| 1416243 | 12/1975 | United Kingdom ............ 252/25 |

OTHER PUBLICATIONS

Mechanical Engineering–"Briefing the Record", vol. 96, No. 6, 1974–Reducing Compressor–Blade Fretting, pp. 44–45.

*Primary Examiner*—Prince Willis, Jr.
*Assistant Examiner*—Alan D. Diamond
*Attorney, Agent, or Firm*—Jerome C. Squillaro; Carmen Santa Maria

[57] ABSTRACT

A dry film, low coefficient of friction lubricant for titanium pieces is prepared by mixing together solid lubricant particles, poly(tetrafluoroethylene), a suspending agent, and a curable resin in an evaporable carrier. The mixture is applied to titanium or titanium alloy surfaces that contact each other in service. The carrier is evaporated during a subsequent thermal cure, leaving a lubricating film on the surfaces.

2 Claims, 2 Drawing Sheets

CURABLE DRY FILM LUBRICANT FOR TITANIUM ALLOYS

BACKGROUND OF THE INVENTION

This invention relates to lubricants, and, more particularly, to a dry film lubricant for use between contacting titanium pieces.

When materials rub or slide against each other during service, the resulting frictional forces can cause damage to the materials through the generation of heat or through a variety of surface deformation or fatigue processes generally termed fretting. These adverse effects can be reduced by reducing the coefficient of friction between the surfaces, by the application of a lubricant. The reduction of friction results in lower heat production, reduced stress on the contact faces, reduced surface deformation, lower fatigue forces, and, consequently, lower fretting damage. Many types of solid, liquid, and gaseous lubricants are known and widely used.

One of the most challenging lubrication problems is encountered with titanium surfaces that rub against each other. In one such situation, a titanium compressor or fan rotor in an aircraft engine has an array of dovetail slots in its outer periphery. The dovetailed base of a titanium compressor or fan blade fits into each dovetail slot. When the disk is at rest, the dovetail of the blade rests within the slot. When the disk is rotating during engine operation, the blade is drawn radially outwardly by centrifugal forces so that the sides of the dovetail of the blade ride against the inwardly sloping sides of the dovetailed slot of the rotor, producing localized elevated stress conditions on the contact surfaces.

There is movement between the two titanium parts with changes in engine operating conditions such as speed and temperature, and as the engine passes through cycles of startup and shutdown. With repeated cycles of operation, this movement becomes a fatigue process. During such low-cycle fatigue, the forces exerted on the rotor in the neighborhood of the dovetail slot can lead to the introduction and propagation of fatigue cracks in the rotor, and eventually to failure, resulting in shortened rotor life. Such fretting damage is of particular concern with titanium parts.

The incidence of fatigue damage can be reduced by lubricating the contact region between the titanium pieces. Liquid lubricants are not practical, because of the operating temperatures of 200°–600° F., nor are gaseous lubricants practical because of the high frictional loads. It has been common practice to deposit low-friction coatings on the titanium pieces, and to use dry film lubricants such as mixtures of molybdenum disulfide and an oxide of antimony between the pieces. However, these lubricants degrade relatively quickly in turbine engine applications due to the high loading stresses, leaving the wear surfaces inadequately lubricated. The lubricants may be reapplied during maintenance.

While these measures are effective in reducing frictional loadings and frictionally induced damage, at least until lubricant degradation occurs, there is a continuing need for improved lubricants. Such improved lubricants would be operable to reduce fretting damage between titanium pieces for larger numbers of cycles, resulting in reduced maintenance requirements, and produce more consistent operating performance. The present invention fulfills this need, and further provides related advantages.

SUMMARY OF THE INVENTION

The present invention provides an improved dry film lubricant that reduces frictional forces and fatigue damage between titanium parts that rub together. In one embodiment, in gas turbine applications on titanium parts, the lubricant is operable at typical fan rotor and compressor rotor service temperatures of up to 600° F. to provide an extended operating life before the onset of fretting damage. The lubricant may be used in conjunction with other damage-reduction methods. The curable thin film lubricant of the invention is easily and reliably applied both initially and in the field, an important advantage where periodic maintenance is to be performed.

In accordance with the invention, a process for lubricating two pieces of titanium comprises the steps of furnishing a first piece of titanium and a second piece of titanium; placing on at least one of the two pieces of titanium a lubricant comprising a mixture of solid lubricant particles, poly(tetrafluoroethylene), a suspending agent, a curable resin, and a carrier; evaporating the carrier from the lubricant; and curing the resin.

In one particularly preferred embodiment, the pieces of titanium are a compressor rotor having dovetail slots therein and compressor blades each with a dovetail therein that fits within the slot. Before the blades are assembled into the slots, the lubricant is applied to at least one, and preferably both, of the mating faces of the interior of the rotor slot and the blade dovetail. In this preferred embodiment, the curable lubricant mixture has about 38 percent by weight of the solid lubricant particles, about 24 percent by weight poly(tetrafluoroethylene) (which is sometimes known as "teflon ®", a trademark of E.I. dupont de Nemours Co.), about 2 percent of bentonite suspending agent, and about 36 percent by weight of an epoxy-phenolic resin. The dry lubricant particles are inorganic salts, preferably molybdenum disulfide and antimony oxide. The lubricant mixture is mixed with a sufficient amount of a carrier such as methylethyl ketone or isopropyl alcohol to permit application. If the lubricant is to be applied by brushing, a relatively small amount of the carrier is used. If the application is by spraying or dipping, a relatively larger amount of the carrier is used. The bentonite aids in maintaining the other ingredients in a stable suspension until the application is complete and the carrier has been evaporated. The lubricant is then cured as a thin film about 0.002–0.003 inches thick.

The resulting curable dry film lubricant containing both solid lubricant particles and poly(tetrafluoroethylene) is stable at elevated operational temperatures up to about 600° F. It provides a coefficient of friction about 30 percent lower than obtainable with conventional dry film lubricants, and significantly increased operational life without breakdown or extrusion of the lubricant. The operational life of the rotor and blade assembly is substantially lengthened, and the periods between maintenance is also increased.

The dry film lubricant of the invention may be used in conjunction with other life-extending improvements. For example, it has been known to coat one or both of the titanium pieces with an alloy of copper, nickel, and indium to increase their fatigue lives, or to use a thin sacrificial shim between the blade dovetail and the rotor dovetail slot. These approaches can be used, and then the curable dry film lubricant of the invention also used to lubricate the wearing surface.

In the presently most preferred embodiment, the titanium alloy blade dovetail is coated with the copper-nickel-indium alloy, and then the dry film lubricant of the invention is applied over the coating. A coating of the dry film lubricant is also applied to the wear surface on the interior of the dovetail slot of the rotor. The blade dovetail is then assembled into the rotor dovetail slot with a non-titanium, metallic alloy shim therebetween.

The present invention provides a reliable dry film lubricant that is readily applied and extends the service life and time between maintenance of titanium alloy parts that rub against each other. Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENT

Figure 1:
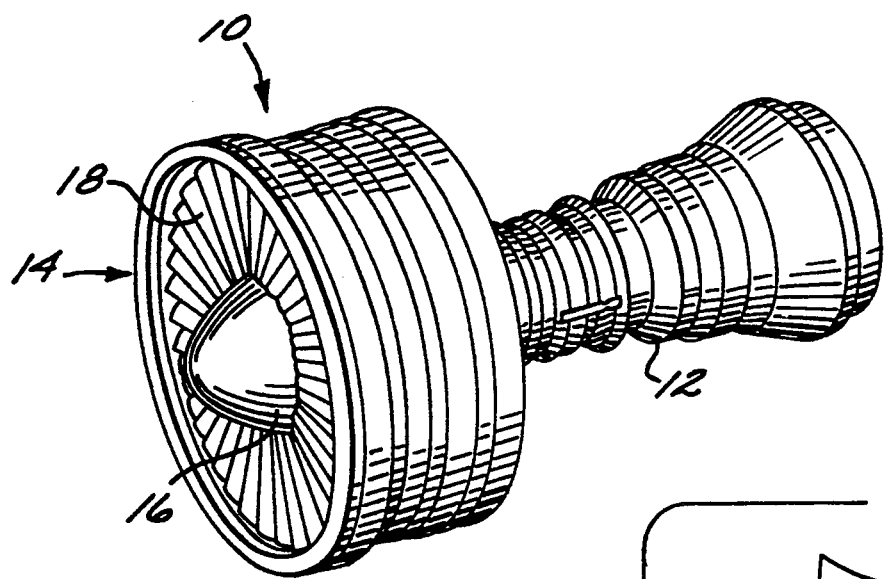
FIG. 1 is a perspective view of a gas turbine engine.

The curable dry film lubricant of the invention is preferably used in the lubrication of parts of an aircraft gas turbine 10 such as that shown in FIG. 1. The gas turbine engine 10 includes a gas turbine section 12 with a bypass fan 14 driven thereby. The bypass fan 14 includes a fan disk or rotor 16 having a plurality of fan blades 18 mounted thereto. The use of the present invention will be discussed in relation to the fan rotor and blades, but is equally applicable to the compressor rotor and blades in the compressor portion of the gas turbine 12. The fan rotor 16, fan blades 18, compressor disk, and compressor blades are sometimes made of titanium or titanium alloys. (As used herein, the term "titanium" is used to include both substantially pure titanium and titanium alloys.)

Figure 2:
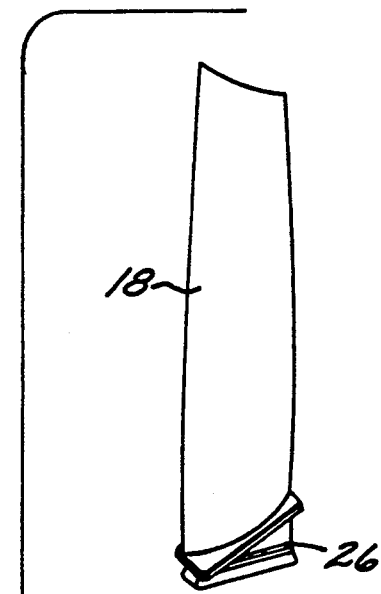
FIG. 2 is a perspective exploded view of a fan rotor and fan blade.
Figure 2:
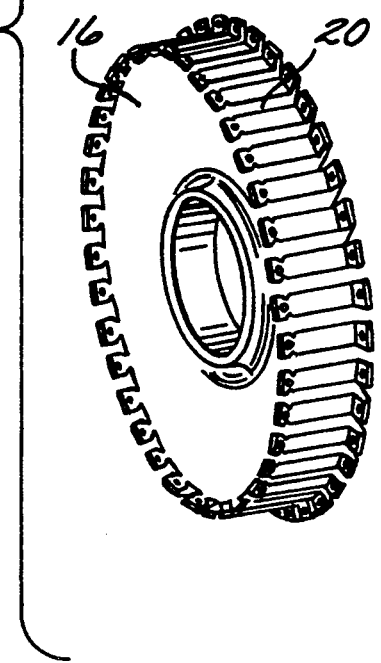
Figure 3:
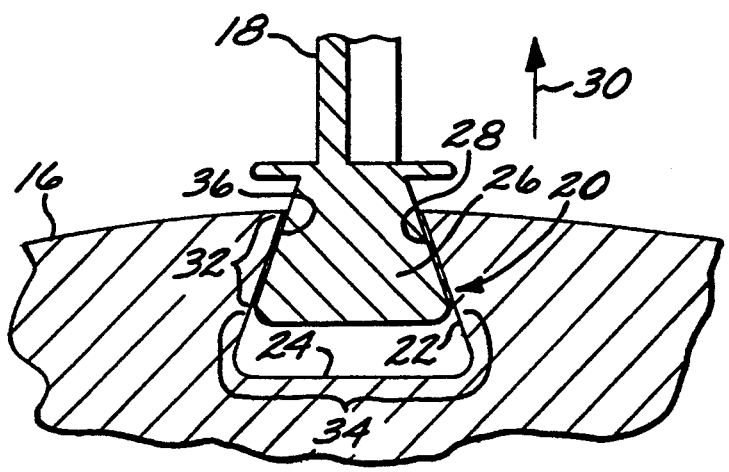
FIG. 3 is a side elevational view of a portion of the assembled fan rotor and fan blade, lubricated with the dry film lubricant of the invention.

The assembly of the fan blades 18 to the fan rotor 16 is illustrated in greater detail in FIGS. 2 and 3. The rotor 16 has a plurality of dovetail slots 20 around its circumference, opening radially. Each dovetail slot 20 has sloping side walls 22 originating at the outer periphery of the rotor 16 and extending inwardly toward the hub of the rotor. The walls 22 diverge with increasing distance from the periphery of the rotor 16, ending in a bottom 24. Each fan blade 18 has at its lower end a dovetail 26 with sloping sides 28 that diverge toward the dovetail bottom. The dovetail 26 is configured and sized to slide into the dovetail slot 20, as shown in FIG. 3.

When the rotor 16 is at rest, the dovetail 26 rests within the dovetail slot 20. When the gas turbine engine 10 is operated, the rotor 16 rotates about a central shaft so that the blade 18 moves radially outwardly due to centrifugal force, in the direction of the arrow 30 of FIG. 3. The dovetail side 28 then bears against the slot side wall 22 to secure the blade 18 against the rotor 16 and prevent the blade 18 from being thrown clear of the rotor 16. As will be apparent from an inspection of FIG. 3, there is a loaded bearing or contacting region, generally indicated by numeral 32, where the dovetail side 28 faces and contacts the slot side wall 22, and a non-bearing region, generally indicated by numeral 34, where there is no such loaded bearing between the surfaces.

As the gas turbine engine 10 operates from rest, through flight operations, and then again to rest (a "cycle"), the blade 18 is pulled in the direction 30 with varying loads and consequent interaction between the surfaces in the bearing region 32. The dovetail side 28 and the slot side wall 22 slide past each other by a distance that is small, typically about 0.010 inch or less, but yet is sufficient to cause fretting fatigue damage. Of most concern is the effect on the rotor 16, where small cracks form after repeated cycles. Such cracks extend into the rotor 16 from the slot side wall 22 and can ultimately result in reduced rotor life.

In accordance with the invention, a lubricated titanium rotor and blade assembly comprises a titanium rotor having a dovetail slot in the circumference thereof; a titanium blade having a dovetail sized to fit into the slot, there being mating faces on the dovetail and in the interior of the slot; and a curable lubricant applied to the mating face of at least one of the dovetail of the blade and the rotor slot, the curable lubricant comprising a mixture of solid lubricant particles, poly(tetrafluoroethylene), a suspending agent, and a curable resin. A lubricant comprises solid lubricant particles, poly(tetrafluoroethylene), a suspending agent, and a curable resin.

The lubricant is coated onto one or (preferably) both of the dovetail side 28 and the slot side walls 22 over the bearing region 32. The lubricant reduces the coefficient of friction between the dovetail side 28 and the slot side walls 22, which in turn reduces the frictionally induced forces that can lead to formation of cracks in the rotor 16 and the blade dovetail 26. Both the rotor 16 and the blade dovetail 18 are made of a titanium alloy such as Ti-6Al-4V. The low temperature (i.e., less than 300° F.) and elevated temperature fatigue contact of titanium against titanium is of special concern, because cold welding and galling can occur, increasing both the coefficient of friction and the stress levels at the surfaces, with a higher potential for cracking. The curable dry film lubricant of the present invention reduces cold welding, galling, and the incidence of cracking, as well as the coefficient of friction, in applications up to about 600° F.

It has been known to apply a dry film lubricant of molybdenum disulfide mixed with antimony oxide to the slot side walls 22 and the dovetail side 28 to reduce friction. While operable, this approach has the shortcoming that it is difficult to consistently apply a well-controlled lubricant film due to settling out of the lubricant particles from their suspension. The lubricant film may be removed from the bearing region 32 after some fairly small number of cycles. Periodic re-application is then required. The number of engine cycles required before re-application of the lubricant is not readily predictable, so that maintenance schedules must be adjusted for the smallest likely number of cycles before the loss of lubricant. Finally, the sliding coefficient of friction of titanium alloys against titanium alloys, where each have been lubricated with the conventional dry film lubricant, is about 0.10. While this value is acceptable, an even lower coefficient is desirable.

The present invention overcomes these problems found in the prior approach. The lubricant is formed as a suspension/solution of the lubricating agents in a carrier, and the suspension/solution is readily applied by dipping, spraying, brushing, or other convenient technique. The amount of carrier is selected as required for the intended application procedure. Spraying or dipping is preferred for exterior surfaces such as the dovetail side 28, while brushing is preferred for interior surfaces such as the slot side walls 22. In the most preferred application technique, a thin bubble-free layer, on the order of 0.001 thick, is first deposited on a surface and the carrier is permitted to evaporate. A second layer is deposited, and the carrier permitted to evaporate. The layered application is repeated as necessary so that a lubricant coating 36 of controllable thickness is gradually build up. In most instances, the preferred final lubricant thickness is 0.002-0.003 inches. The coating is cured to complete the application process.

The components of the curable lubricant are selected to achieve good lubricant performance and applicability. The lubricant constituents of the dry film lubricant are solid lubricant particles and poly(tetrafluoroethylene). The solid lubricant particles are preferably inorganic salts such as molybdenum disulfide and antimony oxide. The particle size is not critical, and may be of any size that is capable of being applied by the selected application technique.

Poly(tetrafluoroethylene) is a known lubricant, but is not normally considered for use in lubricating titanium pieces at high stress and elevated temperature because it is quickly removed by frictional processes. As will be reported in comparative test results, the present lubricant far outperforms either the conventional dry film lubricants or poly(tetrafluoroethylene) when used by themselves.

The suspending agent is preferably submicron particles of bentonite clay, most preferably the commercially available Bentone 34. The suspending agent prevents separation of the components of the lubricant when mixed together and with the carrier. In the absence of a suspending agent, the components tend to separate before they can be applied and cured, leading to unpredictable, but usually inferior, performance of the lubricant.

The curable resin binds the other components together after curing, holding them in place on the surface of the lubricated piece. The resin is important in preventing extrusion of the lubricant from the surface under the high normal loads associated with the frictional processes. The preferred resin is a curable epoxy resin such as EPON-828 liquid soft resin available from Shell. A phenolic UCAR resin available from Union Carbide, or an acrylic resin, may also be used.

These components are mixed with a carrier that dissolves and suspends them. The extent of suspension, as distinct from dissolution, is not of concern, as it is important only to use the carrier to form a generally homogeneous curable formulation to allow application to the substrate. Preferred carriers include methylethyl ketone and isopropyl alcohol. Other carriers such as toluene can be used, provided that their evaporants are objectionable environmentally. The amount of the carrier is adjusted to permit application by the chosen technique. For application by brushing, the carrier is about 50 percent by volume of the applied mixture, while for application by spraying the carrier is about 75 percent by volume of the applied mixture.

On a non-carrier basis (that is, not including the amount of carrier), the amount of solid lubricant particles preferably is from about 35 to about 45 percent by weight of the curable lubricant. If less is used, there may be insufficient lubrication and the coefficient of friction undesirably increased. If more is used, there is no improvement in properties and proportionally less of other key components must be used. The amount of poly(tetrafluoroethylene) preferably is from about 20 to about 30 percent by weight of the curable dry film lubricant. The ratio of the weight of the lubricant particles to the poly(tetrafluoroethylene) is maintained in the ratio of from about 1.5 to about 2.0. If a lower ratio is used, there is insufficient lubrication. If the ratio is higher, there is no improvement in properties and proportionally less of other key components may be used. Additionally, too high a poly(tetrafluoroethylene) content leads to reduced cyclic performance of the lubricant due to extrusion of the lubricant from the contacting region.

Again on a non-carrier basis, the amount of suspending agent, preferably bentonite, preferably ranges from about 1 to about 3 weight percent of the solid dry film lubricant, and more preferably is from about 1 to about 2 percent by weight. If less is used, an insufficient suspending effect is realized. If more is used, there is no improvement in suspension. The amount of curable resin preferably is from about 30 to about 40 weight percent of the curable dry film lubricant. If less is used, the lubricant is not sufficiently bound together and can readily extrude from the contacting region leading to reduced cyclic life. If more is used, the amount of other ingredients must be proportionally reduced.

On a non-carrier basis, a preferred lubricant includes about 24 percent by weight poly(tetrafluoroethylene), about 38 percent by weight solid lubricant particles, about 2 percent by weight bentonite, and about 36 percent by weight resin.

After mixing and applying as discussed previously, the curable lubricant is cured in a manner recommended for the resin used. In the preferred approach, the curable thin film lubricant is cured for 1 hour at a temperature of about 375°-400° F. (As used herein, the term "curable" is applied to the lubricant of the invention in both its uncured and cured states, to distinguish it from prior approaches.)

Figure 4:
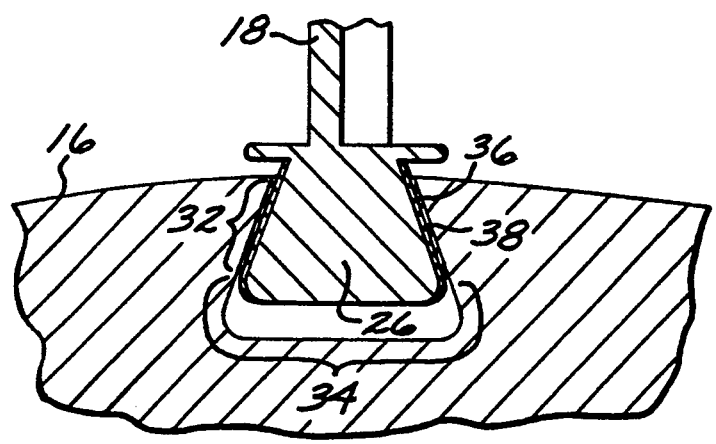
FIG. 4 is a side elevational view similar to that of FIG. 3, except with the blade having a low-friction coating thereon.

The curable dry film lubricant of the present invention may be applied directly to the titanium alloy pieces, as depicted in FIG. 3, or may be used in conjunction with other damage reduction techniques. For example, FIG. 4 illustrates a rotor 16 and blade 18 wherein the bearing region 32 of the dovetail 26 is coated with a layer 38 of a friction reducing alloy. (Alternatively, the contacting region of the slot side wall, or both, may be coated with the layer 38.) A typical copper base alloy has a nominal composition of about 57 weight percent copper, about 37 weight percent nickel, and about 6 weight percent indium, for example, and is applied in a conventional manner by plasma spraying, although other copper base and nickel base friction reducing alloys may be applied in a similar manner. The layer 36 of lubricant is applied over the layer 38 of metal, and also directly onto the titanium of the slot side wall 22.

Figure 5:
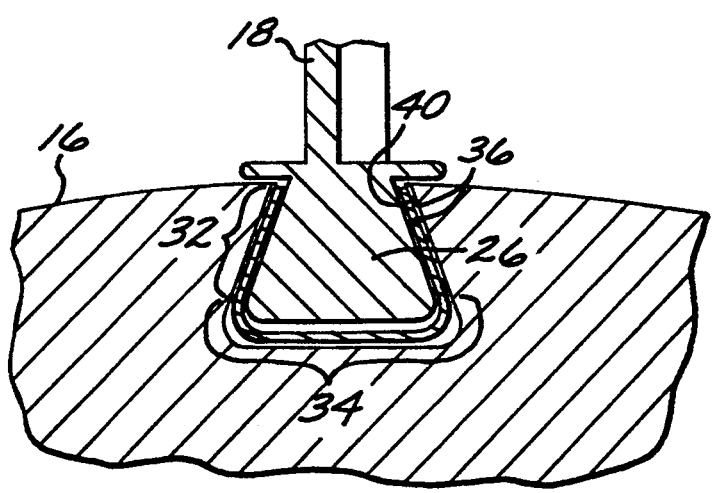
FIG. 5 is a side elevational view similar to that of FIG. 3, except with an anti-wear shim interposed between the blade dovetail and the walls of the dovetail slot of the rotor.

In yet another approach illustrated in FIG. 5, a shim 40 is placed within the dovetail slot 20 between the slot side walls 22 and the dovetail sides 28 of the dovetail 26, covering at least the bearing region 32. The curable lubricant layer 36 is applied to the titanium alloy of the side wall 22 and to the dovetail 28, in the bearing region 32.

The approaches of FIGS. 4 and 5 can be combined in any way to achieve improved results. For example, in one version the bearing region 32 of the slot side wall 22 of the rotor 16 is coated with a layer 32 of the curable dry film lubricant of the invention. The dovetail side 28 of the dovetail 26 on the blade 18 is coated with the layer 38 of the copper-nickel-indium alloy, and then with the layer 36 of the curable dry film lubricant. A shim 40 about 0.008–0.025 inch thick of a copper-based, nickel-based, or steel alloy is placed within the slot 20 between the side walls 22 and the dovetail 26 during assembly.

The approach of the invention has been comparatively tested against other techniques for reducing frictional fatigue damage. Sliding block tests were conducted at a normal loading of about 80,000 pounds per square inch and at a temperature of 200° F., to approximate one condition experienced in a gas turbine engine. The results vary over ranges, but the results in Table I for number of cycles to failure and coefficients of friction (COF) during the test are representative.

TABLE I

| Condition | Cycles | COF |
| --- | --- | --- |
| 1. Titanium against Titanium | 100–300 | — |
| 2. No. 1, except each lubricated with prior thin film lubricant | 1000 | 0.10 |
| 3. No. 1, except each lubricated with the lubricant of the invention | 1500 | 0.05 |
| 4. Titanium coated with CuNiIn against Titanium coated with CuNiIn (contact stress 135,000 pounds per square inch) | 2500 | 0.80 |
| 5. No. 4, except each lubricated with the lubricant of the invention | 10,000 | 0.08 |
| 6. No. 1, except each lubricated with poly(tetrafluoroethylene) only | <100 | 0.12 |

The solid lubricant of the invention thus provides improved performance over those previously available.

Although the present invention has been described in connection with specific examples and embodiments, it will be understood by those skilled in the arts involved, that the present invention is capable of modification without departing from its spirit and scope as represented by the appended claims.

What is claimed is:

1. A lubricated titanium rotor and blade assembly, comprising:
   a titanium rotor having a dovetail slot in the circumference thereof;
   a titanium blade having a dovetail sized to fit into the slot, there being mating faces on the dovetail and in the interior of the slot; and
   a curable lubricant applied to the mating surface of at least one of the dovetail of the blade and the rotor slot, wherein the curable lubricant consists essentially of, on a non-carrier basis, a mixture of from 20 to 30 percent by weight poly(tetrafluoroethylene), from 35 to 45 percent by weight solid lubricant particles, from 1 to 3 percent by weight bentonite, from 30 to 40 percent by weight resin selected from the group consisting of epoxy resin, phenolic resin and acrylic resin, and an evaporable carrier, the evaporable carrier present in an amount sufficient to permit the application of the curable lubricant by spraying.

2. A lubricated titanium rotor and blade assembly, comprising:
   a titanium rotor having a dovetail slot in the circumference thereof;
   a titanium blade having a dovetail sized to fit into the slot, there being mating faces on the dovetail and in the interior of the slot; and
   a curable lubricant applied to the mating surface of at least one of the dovetail of the blade and the rotor slot, wherein the curable lubricant consists essentially of, on a non-carrier basis, a mixture of 24 percent by weight poly(tetrafluoroethylene), 38 percent by weight solid lubricant particles, 2 percent by weight bentonite, 36 percent by weight resin selected from the group consisting of epoxy resin, phenolic resin and acrylic resin, and an evaporable carrier, the evaporable carrier present in an amount sufficient to permit the application of the curable lubricant by spraying.

* * * * *